(12) United States Patent
Tian et al.

(10) Patent No.: US 12,259,609 B2
(45) Date of Patent: Mar. 25, 2025

(54) DISPLAY DEVICE AND SPLICED DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Zhaoshou Tian, Beijing (CN); Zhanchang Bu, Beijing (CN); Haijun Shi, Beijing (CN); Hongbo Feng, Beijing (CN); Dan Li, Beijing (CN); Qingshan Qu, Beijing (CN); Bochang Wang, Beijing (CN); Jixing Sun, Beijing (CN); Shanlei Hou, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/293,769

(22) PCT Filed: Sep. 21, 2022

(86) PCT No.: PCT/CN2022/120092
§ 371 (c)(1),
(2) Date: Jan. 30, 2024

(87) PCT Pub. No.: WO2023/124281
PCT Pub. Date: Jul. 6, 2023

(65) Prior Publication Data
US 2024/0377668 A1    Nov. 14, 2024

(30) Foreign Application Priority Data
Dec. 29, 2021  (CN) .......................... 202111641931.6

(51) Int. Cl.
*G02F 1/1333*   (2006.01)
*F21V 8/00*     (2006.01)

(52) U.S. Cl.
CPC ..... *G02F 1/133308* (2013.01); *G02B 6/0086* (2013.01); *G02F 1/13336* (2013.01)

(58) Field of Classification Search
CPC ........... G02F 1/133308; G02F 1/13336; G02B 6/0086
See application file for complete search history.

(56) References Cited

U.S. PATENT DOCUMENTS 6,304,308 B1 * 10/2001 Saito ................. G02F 1/133512
349/110
10,324,320 B2    6/2019 Han et al.
(Continued)

FOREIGN PATENT DOCUMENTS

CN    107357063 A    11/2017
CN    110161751 A     8/2019
(Continued)

*Primary Examiner* — Donald L Raleigh
(74) *Attorney, Agent, or Firm* — Kinney & Lange, P.A.

(57) ABSTRACT

A display device is provided, including: a display panel; a light guide component on a light entering side of the display panel; and a supporting assembly connected to the display panel and the light guide component. The supporting assembly is configured to support the display panel and the light guide component, and the supporting assembly includes: a frame body having a first supporting surface facing the display panel, the light guide component being fixed on the first supporting surface; and a light transmission portion on the first supporting surface and on an outer side of a side surface of the light guide component, the light transmission portion having a second supporting surface facing the display panel. The display panel is fixed on the second supporting surface, and the light transmission portion is con-
(Continued)

figured to refract light so that the refracted light exits through the second supporting surface.

18 Claims, 6 Drawing Sheets

(56) References Cited

U.S. PATENT DOCUMENTS

| | | | |
|---|---|---|---|
| 2014/0183571 A1* | 7/2014 | Lee | G02B 6/0053 |
| | | | 257/88 |
| 2017/0131584 A1* | 5/2017 | Liu | G02F 1/133526 |
| 2017/0184911 A1* | 6/2017 | Ochi | G02F 1/133308 |
| 2017/0192273 A1 | 7/2017 | Fan | |
| 2021/0041739 A1 | 2/2021 | Hwang | |
| 2022/0236604 A1 | 7/2022 | Dong et al. | |

FOREIGN PATENT DOCUMENTS

| | | |
|---|---|---|
| CN | 110544427 A | 12/2019 |
| CN | 209880030 U | 12/2019 |
| CN | 110703495 A | 1/2020 |
| CN | 209946590 U | 1/2020 |
| CN | 210516007 U | 5/2020 |
| CN | 111369900 A | 7/2020 |
| CN | 112068353 A | 12/2020 |
| CN | 212934616 U | 4/2021 |
| CN | 112764254 A | 5/2021 |
| CN | 113311619 A | 8/2021 |
| CN | 214795497 U | 11/2021 |
| CN | 114399959 A | 4/2022 |
| WO | 2017045243 A1 | 3/2017 |

* cited by examiner

DISPLAY DEVICE AND SPLICED DISPLAY DEVICE

CROSS REFERENCE TO RELATED APPLICATION(S)

This application is a Section 371 National Stage Application of International Application No. PCT/CN2022/120092, filed on Sep. 21, 2022, entitled "DISPLAY DEVICE AND SPLICED DISPLAY DEVICE", which claims priority to Chinese Patent Application No. 202111641931.6, filed on Dec. 29, 2021, and the contents of which are incorporated herein by reference in their entirety.

TECHNICAL FIELD

The present disclosure relates to a field of a display technology, and in particular, to a display device and a spliced display device.

BACKGROUND

With a rapid development of a flat panel display technology, sizes and application scenarios of display devices are continuously expanding. In many scenarios, such as a conference room display terminal, a monitoring display terminal, etc., it is needed to splice a plurality of display devices into a large spliced display device to meet display requirements. A mold frame is often used in a display device to support a display panel. The mold frame is generally made of an opaque material, which prevents light from reaching a part of the display panel that is in contact with the mold frame. This may lead to problems such as a dim picture at an edge of the display panel, which may affect a display effect of the spliced display device at a seam.

SUMMARY

In order to solve at least one aspect of the above-mentioned problems, the present disclosure provides a display device and a spliced display device.

In an aspect, a display device is provided, including: a display panel; a light guide component on a light entering side of the display panel; and a supporting assembly connected to the display panel and the light guide component, wherein the supporting assembly is configured to support the display panel and the light guide component, wherein the supporting assembly includes: a frame body having a first supporting surface facing the display panel, wherein the light guide component is fixed on the first supporting surface; and a light transmission portion on the first supporting surface and on an outer side of a side surface of the light guide component, wherein the light transmission portion has a second supporting surface facing the display panel, the display panel is fixed on the second supporting surface, and the light transmission portion is configured to refract light so that the refracted light exits through the second supporting surface.

According to some exemplary embodiments, the frame body includes a mold frame, the first supporting surface is located at an end of the mold frame facing the display panel, and the first supporting surface is parallel to the second supporting surface and parallel to a surface of the display panel.

According to some exemplary embodiments, the mold frame includes a fixing groove on the first supporting surface; and the light transmission portion includes an inverted stuck component at an end of the light transmission portion away from the second supporting surface, and the inverted stuck component is embedded into the fixing groove.

According to some exemplary embodiments, the fixing groove has a top surface coplanar with the first supporting surface and a bottom surface parallel to the first supporting surface; and a cross-sectional area of the fixing groove in a direction parallel to the surface of the display panel gradually increases from the top surface to the bottom surface.

According to some exemplary embodiments, when the inverted stuck component is embedded into the fixing groove, a periphery of the inverted stuck component fits an inner wall of the fixing groove; and the inverted stuck component is molded in the fixing groove through injection molding.

According to some exemplary embodiments, the display device further includes a circuit component and a protective layer, the circuit component covers a part of a side surface of the display panel, the circuit component is electrically connected to the display panel, and the protective layer is provided on an outer side of the side surface of the display panel to protect the circuit component.

According to some exemplary embodiments, the protective layer is filled at a periphery of the circuit component, and an orthographic projection of the protective layer on the side surface of the display panel does not overlap with an orthographic projection of the circuit component on the side surface of the display panel.

According to some exemplary embodiments, the display device further includes a sealing adhesive on a side of the protective layer away from the display panel.

According to some exemplary embodiments, the supporting assembly further includes a light guide portion on the first supporting surface and between the frame body and the light guide component, the light guide portion has a third supporting surface facing the display panel, and the light guide component is fixed on the third supporting surface; and the light guide portion is configured to refract light so that the refracted light exits through the third supporting surface.

According to some exemplary embodiments, a side of the light guide portion facing the light transmission portion is abutted against a surface of the light transmission portion, and an orthographic projection of the light guide portion and the light transmission portion on the first supporting surface covers the first supporting surface.

According to some exemplary embodiments, the light guide portion and the light transmission portion are formed as an integrated structure.

According to some exemplary embodiments, the light transmission portion and/or the light guide portion are/is molded by injection molding.

According to some exemplary embodiments, the light transmission portion and/or the light guide portion are/is made of a transparent material.

According to some exemplary embodiments, the display panel includes a display region and a non-display region surrounding the display region, and a width of the non-display region on any side of the display panel ranges from 0.5 mm to 1.2 mm.

According to some exemplary embodiments, in a direction parallel to the display panel, the display panel has a first side and a second side opposite to the first side, and the width of the non-display region on the first side of the display panel is 1.2 mm, and/or the width of the non-display region on the second side of the display panel is 0.5 mm.

According to some exemplary embodiments, the light transmission portion is connected to the non-display region of the display panel, and an orthographic projection of the non-display region of the display panel on the second supporting surface covers the second supporting surface.

According to some exemplary embodiments, a side of the light transmission portion away from the light guide component is aligned with a side surface of the display panel and a side surface of the mold frame.

According to some exemplary embodiments, the display panel is bonded to the second supporting surface of the light transmission portion through an optical adhesive, and the optical adhesive includes a UV adhesive and/or a hot melt adhesive.

According to some exemplary embodiments, the mold frame is made of aluminum or an aluminum alloy material.

According to some exemplary embodiments, the protective layer is made of a metal material.

In another aspect, a spliced display device is provided, which is spliced by a plurality of display devices described above.

BRIEF DESCRIPTION OF THE DRAWINGS

With following descriptions of the present disclosure with reference to accompanying drawings, other objectives and advantages of the present disclosure may be clear and the present disclosure may be understood comprehensively, in the drawings.

Figure 1:
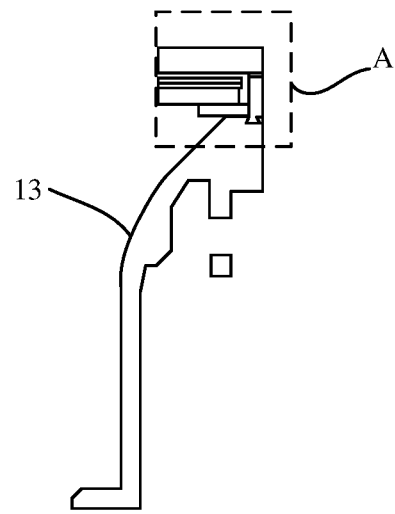
FIG. 1 shows a schematic cross-sectional view of a display device according to embodiments of the present disclosure.

It should be noted that for the sake of clarity, sizes of layers, structures or regions may be enlarged or reduced in figures used to describe embodiments of the present disclosure, that is, those figures are not drawn according to actual scale.

DETAILED DESCRIPTION OF EMBODIMENTS

Technical solutions of the present disclosure will be further described in detail below through embodiments with reference to accompanying drawings. In the specification, the same or similar reference numerals represent the same or similar components. The following descriptions of embodiments of the present disclosure with reference to accompanying drawings are intended to explain a general inventive concept of the present disclosure, and should not be understood as a limitation to the present disclosure.

In addition, in the following detailed descriptions, for the convenience of explanation, many specific details are set forth to provide a comprehensive understanding of embodiments of the present disclosure. However, it is clearly that one or more embodiments may also be implemented without these specific details.

It should be noted that although the terms "first", "second", and so on may be used herein to describe various components, members, elements, regions, layers and/or portions, these components, members, elements, regions, layers and/or portions should not be limited by these terms. Rather, these terms are used to distinguish one component, member, element, region, layer and/or portion from another one. Thus, for example, a first component, a first member, a first element, a first region, a first layer and/or a first portion discussed below may be referred to as a second component, a second member, a second element, a second region, a second layer and/or a second portion without departing from teachings of the present disclosure.

Unless otherwise specified, the expression "abutted against" used herein refers to abutted on, which indicates a connection relationship between two members or components. In such connection relationship, adjacent surfaces of two members or components are abutted against and in contact with each other.

According to embodiments of the present disclosure, a display device 1 is provided, including: a display panel 11; a light guide component 12 on a light entering side of the display panel 11; and a supporting assembly 13 connected to the display panel 11 and the light guide component 12. The supporting assembly 13 is used to support the display panel 11 and the light guide component 12. The supporting assembly 13 includes: a frame body having a first supporting surface 1311 facing the display panel 11, where the light guide component 12 is fixed on the first supporting surface 1311; and a light transmission portion 132 on the first supporting surface 1311 and on an outer side of a side surface of the light guide component 12. The light transmission portion 132 has a second supporting surface 1321 facing the display panel 11, and the display panel 11 is fixed on the second supporting surface 1321. The light transmission portion 132 is used to refract light, so that the refracted light exits through the second supporting surface 1321. In embodiments of the present disclosure, by providing the light transmission portion 132 on the frame body, the display panel 11 may be supported through the contact between the light transmission portion 132 and the display panel 11. The light entering the light transmission portion 132 may be refracted to the second supporting surface 1321, and the light exited from the second supporting surface 1321 may enter the display panel 11, then the light at an edge of the display panel 11 is more sufficient, and a display effect at the edge of the display panel 11 is improved.

Figure 2:
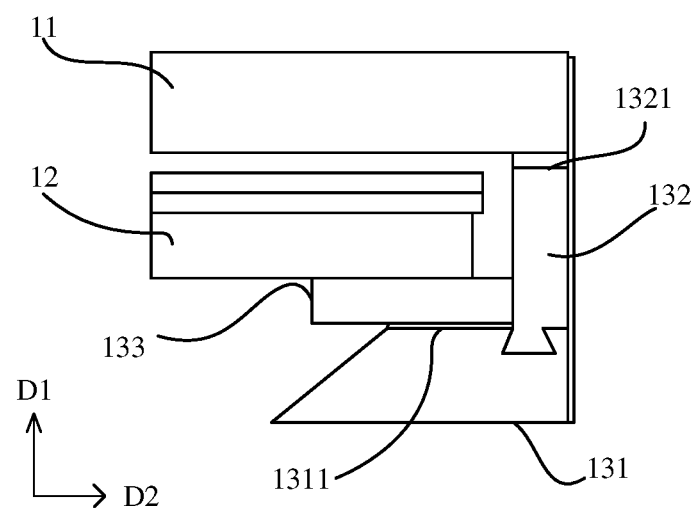
FIG. 2 shows a schematic enlarged view of part A in FIG. 1.

FIG. 1 shows a schematic cross-sectional view of a display device according to embodiments of the present disclosure. FIG. 2 shows a schematic enlarged view of part A in FIG. 1. It should be noted that herein, a liquid crystal display panel (i.e., LCD display panel) is illustrated as an example of the display panel 11 for splicing in describing embodiments of the present disclosure. However, embodiments of the present disclosures are not limited to this. For example, in other embodiments, the display panel 11 for splicing may include but not be limited to an OLED display panel (i.e., organic light emitting diode display panel), a Mini-LED display panel (Sub-millimeter light emitting diode display panel), etc.

It should also be noted that herein, the light guide component 12 is provided between a backlight for providing a light source (not shown) and a light entering side of the display panel 11. The light guide component 12 may be used to diffuse light, so that the light reaching the display panel 11 is more uniform. For example, the light guide component 12 may include a diffusion plate, the diffusion plate may be provided opposite to the display panel 11. The diffusion plate may have a function of increasing a screen obscuration and supporting a film material. The diffusion plate may be made of polystyrene (PS), which is not limited in the present disclosure. The light guide component 12 may further include a diffusion sheet, the diffusion sheet may be located on a side of the diffusion plate facing the display panel 11. The specific structural form of the light guide component 12 is not limited in embodiments of the present disclosure.

Referring to FIG. 1 and FIG. 2, the display device 1 may include: a display panel 11; a light guide component 12 on a light entering side of the display panel 11; and a supporting assembly 13 connected to the display panel 11 and the light guide component 12. The supporting assembly 13 is used to support the display panel 11 and the light guide component 12. Specifically, the supporting assembly 13 has a first supporting surface 1311 and a second supporting surface 1321, and the first supporting surface 1311 is located on a side of the second supporting surface 1321 away from the display panel 11. The second supporting surface 1321 is abutted against the light entering side of the display panel 11 to support the display panel 11. The first supporting surface 1311 is matched with the light guide component 12 to support the light guide component 12. In embodiments of the present disclosure, the supporting assembly 13 may include: a frame body, where the frame body is provided with the first supporting surface 1311 facing the display panel 11, and the light guide component 12 is fixed on the first supporting surface 1311; and a light transmission portion 132 on the first supporting surface 1311 and on an outer side of a side surface of the light guide component 12. The light transmission portion 132 is provided with the second supporting surface 1321 facing the display panel 11, and the display panel 11 is fixed on the second supporting surface 1321. The light transmission portion 132 is used to refract light, so that the refracted light exits through the second supporting surface 1321.

In the present disclosure, for the convenience of description, three directions D1, D2 and D3 are established. For example, the direction D1 may represent a direction of light entering the display panel 11, the direction D2 may represent a direction parallel to the surface of the display panel 11 and perpendicular to the side surface of the display panel 11, and the direction D3 may represent a direction parallel to the surface of the display panel 11 and parallel to the side surface of the display panel 11. Optionally, the directions D1, D2 and D3 may intersect with each other, such as perpendicular to each other. It should be understood that these directions are merely for the convenience of describing embodiments of the present disclosure and are not intended to limit embodiments of the present disclosure.

Continuing to refer to FIG. 1 and FIG. 2, the frame body may include a mold frame 131. The first supporting surface 1311 is located at an end of the mold frame 131 facing the display panel 11. The first supporting surface 1311 is parallel to the second supporting surface 1321 and parallel to the surface of the display panel 11.

In embodiments of the present disclosure, the mold frame 131 may serve as a support for the light guide component 12 and the display panel 11. Specifically, the mold frame 131 has the first supporting surface 1311 at the end of the mold frame 131 facing the display panel 11, and an edge of the light guide component 12 is fixed on the first supporting surface 1311. In direction D2 that is parallel to the surface of the display panel 11 and perpendicular to the side surface of the display panel 11, the light transmission portion 132 is arranged on an outer side of the light guide component 12, and the light transmission portion 132 is located between the first supporting surface 1311 and the light entering side of the display panel 11. The light transmission portion 132 has a second supporting surface 1321 at an end of the light transmission portion 132 facing the display panel 11, and the light transmission portion 132 is abutted against the light entering side of the display panel 11 through the second supporting surface 1321. An end of the light transmission portion 132 facing the mold frame 131 is fixed on the first supporting surface 1311, and the light transmission portion 132 and the mold frame 131 jointly support the display panel 11.

For example, the light transmission portion 132 may be made of a transparent material, including but not limited to polymethyl methacrylate (PMMA), polycarbonate (PC), polyethylene terephthalate (PET), or glass. In embodiments of the present disclosure, the light transmission portion 132 is made of transparent PC plastic, transparent PET plastic, or other transparent materials, so that the light emitted by the backlight may enter into the light transmission portion 132 after reaching the surface of the light transmission portion 132, then may be refracted and exit from the second supporting surface 1321, and finally enter the display panel 11 from the light entering side of the display panel 11. In this way, light may reach pixels at the edge of the display panel 11 via the light transmission portion 132, thereby improving clarity of a display picture at the edge of the display panel 11.

For example, in embodiments of the present disclosure, the mold frame 131 may be made of aluminum or an aluminum alloy material. In a related art, the mold frame 131 and the light transmission portion 132 are generally formed by aluminum extrusion, and the surface of the light transmission portion 132 needs to be pasted with a diffuse reflective tape to solve problems of reflection and light accumulation on an inner wall of the aluminum extrusion. In embodiments of the present disclosure, the light transmission portion 132 may be made of transparent PC plastic, no obvious reflection or light accumulation occurs on the surface of the light transmission portion 132, and thus, there is no need to stick a diffuse reflective tape on the light transmission portion 132, thereby saving material and manual pasting costs. Moreover, the light transmission portion 132 may be fixed on the mold frame 131 through injection molding. The mold frame 131 may adopt aluminum alloy to bear the display panel 11 and other components. For example, the mold frame 131 may be made of A16063 material.

Figure 3:
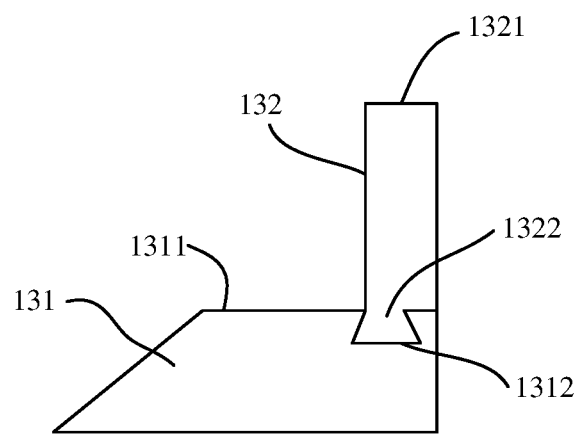
FIG. 3 shows a schematic diagram of an installation form of a light transmission portion and a first supporting surface of a display device according to embodiments of the present disclosure.

FIG. 3 shows a schematic diagram of an installation form of a light transmission portion and a first supporting surface of a display device according to embodiments of the present disclosure.

Referring to FIG. 3, the mold frame 131 includes a fixing groove 1312 on the first supporting surface 1311. The light transmission portion 132 includes an inverted stuck component 1322 at an end of the light transmission portion 132 away from the second supporting surface 1321. The inverted stuck component 1322 is embedded into the fixing groove 1312.

In embodiments of the present disclosure, the inverted stuck component 1322 is arranged at the end of the light transmission portion 132 that is connected to the mold frame 131. The inverted stuck component 1322 is in a form of a structure protruding from the surface of the light transmission portion 132. When the light transmission portion 132 is fixed on the first supporting surface 1311 of the mold frame 131, the inverted stuck component 1322 of the light transmission portion 132 is embedded into the fixing groove 1312. For example, the inverted stuck component 1322 may be interference fit with the fixing groove 1312, so that the light transmission portion 132 is fixed on the first supporting surface 1311. For another example, a plurality of fixed grooves 1312 may be provided on the first supporting surface 1311 of the mold frame 131. Accordingly, a plurality of inverted stuck components 1322 may be provided on the light transmission portion 132, and each inverted stuck component 1322 is embedded into one fixed groove 1312 to achieve a fixation between the light transmission portion 132 and the mold frame 131.

For example, the fixing groove 1312 has a top surface coplanar with the first supporting surface 1311 and a bottom surface parallel to the first supporting surface 1311. A cross-sectional area of the fixing groove 1312 in a direction parallel to the surface of the display panel 11 gradually increases from the top surface to the bottom surface. For example, a side surface of the fixing groove 1312 may be a flat surface, resulting in a roughly circular frustum shape of the fixing groove 1312. The closer to the bottom surface of the fixing groove 1312, the larger the cross-sectional area of the fixing groove 1312 in the direction parallel to the surface of the display panel 11. Accordingly, the inverted stuck component 1322 of the light transmission portion 132 may be also in a roughly circular frustum shape. The further away the inverted stuck component 1322 is from the light transmission portion 132, the larger the cross-sectional area of the inverted stuck component 1322 in the direction parallel to the surface of the display panel 11. Therefore, after the inverted stuck component 1322 is embedded into the fixing groove 1312, it is not easy for the inverted stuck component 1322 to be detached from the fixing groove 1312, so that a stable connection between the light transmission portion 132 and the mold frame 131 is ensured.

Continuing to refer to FIG. 3, when the inverted stuck component 1322 is embedded into the fixing groove 1312, the periphery of the inverted stuck component 1322 fits the inner wall of the fixing groove 1312. The inverted stuck component 1322 is molded in the fixing groove 1312 through injection molding. In embodiments of the present disclosure, the light transmission portion 132 may be prepared by injection molding, that is, if the fixing groove 1312 is in a circular frustum shape, it is possible to form an inverted stuck component 1322 in a circular frustum shape by injection molding, and the inverted stuck component 1322 tightly fits the inner wall of the fixing groove 1312, thereby increasing a stability of a connection between the inverted stuck component 1322 and the fixing groove 1312.

Figure 4:
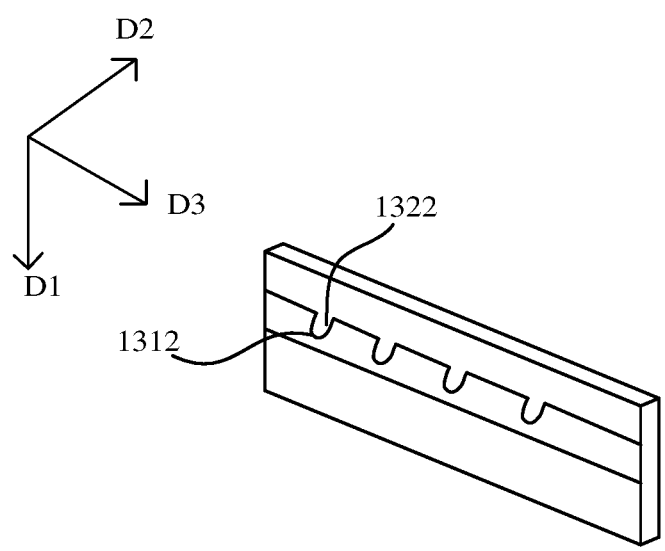
FIG. 4 shows a schematic diagram of another installation form of a light transmission portion and a first supporting surface of the display device according to embodiments of the present disclosure.

FIG. 4 shows a schematic diagram of another installation form of a light transmission portion and a first supporting surface of a display device according to embodiments of the present disclosure.

Referring to FIG. 4, in embodiments of the present disclosure, the fixing groove 1312 may be a roughly U-shaped groove structure. Accordingly, the inverted stuck component 1322 of the light transmission portion 132 is a roughly U-shaped structure. The inverted stuck component 1322 may be embedded into the fixing groove 1312 to achieve connection and fixation. For example, a plurality of U-shaped fixing grooves 1312 may be evenly spaced in direction D3 on the first supporting surface 1311 of the mold frame 131, and a plurality of inverted stuck components 1322 may be correspondingly provided on the light transmission portion 132. The connection firmness may be enhanced through a cooperation of the plurality of inverted stuck components 1322 and the plurality of fixing grooves 1312. It may be understood that in other embodiments, the fixing groove 1312 may be in other structural forms, as long as a firm connection between the light transmission portion 132 and the mold frame 131 may be met.

Figure 5:
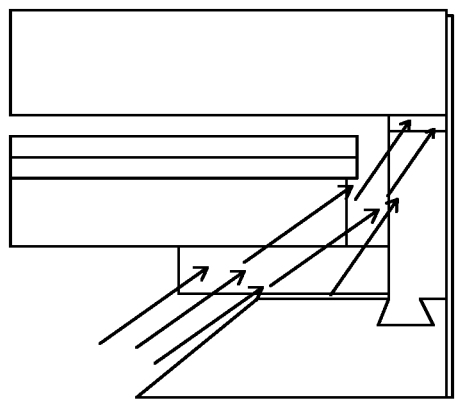
FIG. 5 shows a schematic diagram of an optical path of a display device according to embodiments of the present disclosure, in which an optical path to a display panel via a light transmission portion is schematically shown.

FIG. 5 shows a schematic diagram of an optical path of a display device according to embodiments of the present disclosure, in which an optical path to a display panel via a light transmission portion is schematically shown.

Referring to FIG. 2 and FIG. 5, the supporting assembly 13 may further include a light guide portion 133, and the light guide portion 133 is located on the first supporting surface 1311 and between the frame body and the light guide component 12. The light guide portion 133 has a third supporting surface 1331 facing the display panel 11, and the light guide component 12 is fixed on the third supporting surface 1331. The light guide portion 133 is used to refract light, so that the refracted light exits through the third supporting surface 1331.

For example, both sides of the light guide portion 133 in direction D1 are respectively bonded to the first supporting surface 1311 of the mold frame 131 and the surface of the light guide component 12 through an optical adhesive 16, so that the light guide portion 133 is bonded between the first supporting surface 1311 of the mold frame 131 and the light guide component 12, thereby fixing an edge of the light guide component 12 on the first supporting surface 1311 of the mold frame 131. The light guide portion 133 functions to guide the optical path and transmit light. A light transmittance of the light guide portion 133 may approach 100% as much as possible, which is not specially limited in embodiments of the present disclosure. The optical adhesive 16 has a certain light transmittance, for example, the optical adhesive 16 may be a UV adhesive (photosensitive adhesive) and/or a hot melt adhesive.

For example, the light guide portion 133 may be made of a transparent material, including but not limited to polymethyl methacrylate (PMMA), polycarbonate (PC), polyethylene terephthalate (PET), or glass. In embodiments of the present disclosure, the light guide portion 133 is made of a transparent material such as transparent PC plastic or transparent PET plastic, so that the light emitted by the backlight may pass through the light guide portion 133, and then pass through the light transmission portion 132 to reach the display panel 11. In this way, light may reach pixels at the edge of the display panel 11 through the light guide portion 133 and the light transmission portion 132, so that the clarity of the display picture at the edge of the display panel 11 may be improved, and the picture quality at the peripheral of the display panel 11 may be ensured.

Continuing to refer to FIG. 2, the side of the light guide portion 133 facing the light transmission portion 132 is abutted against the surface of the light transmission portion 132, and an orthographic projection of the light guide portion 133 and the light transmission portion 132 on the first supporting surface 1311 covers the first supporting surface 1311.

For example, one end of the light guide portion 133 in direction D2 is abutted against the side surface of the light transmission portion 132, and a 90° angle is formed at a position where the light guide portion 133 is abutted against the light transmission portion 132. The other end of the light guide portion 133 in direction D2 extends beyond the first supporting surface 1311 to support the light guide component 12. After the light transmission portion 132 is fixed on the first supporting surface 1311 of the mold frame 131, the light guide portion 133 and the light transmission portion 132 may mutually support to enhance a structural strength.

Figure 6:
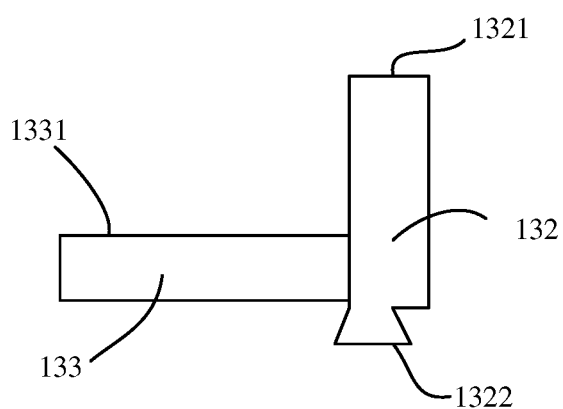
FIG. 6 shows a connection structure diagram of a light guide portion and a light transmission portion of a display device according to embodiments of the present disclosure.

FIG. 6 shows a connection structure diagram of a light guide portion and a light transmission portion of a display device according to embodiments of the present disclosure.

Referring to FIG. 6, the light guide portion 133 and the light transmission portion 132 may be formed as an integrated structure. For example, the light guide portion 133 and the light transmission portion 132 may be connected as an integrated L-shaped structure. By using the inverted stuck component 1322 of the light transmission portion 132, both the light guide portion 133 and the light transmission portion 132 may be fixed on the first supporting surface 1311 of the mold frame 131. Then, the light guide portion 133 and the light transmission portion 132 may be assembled simultaneously. In this way, it is possible to save time for separately preparing and installing the light guide portion 133 and the light transmission portion 132 while meeting a light transmission function of the light guide portion 133 and the light transmission portion 132, so that an efficiency of a production process of the display device 1 may be improved.

For example, the light transmission portion 132 and the light guide portion 133 may be both made of a transparent material. The transparent material may include but not be limited to polymethyl methacrylate (PMMA), polycarbonate (PC), polyethylene terephthalate (PET), or glass. In embodiments of the present disclosure, the light guide portion 133 and the light transmission portion 132 may be made of the same material, for example, the light guide portion 133 and the light transmission portion 132 may be made of transparent PC plastic.

For example, the light transmission portion 132 and the light guide portion 133 may be formed by injection molding. The light transmission portion 132 and the light guide portion 133 may be fixed on the mold frame 131 by integrated injection molding, so that a material cost and a manual assembly cost may be reduced, and a product competitiveness may be enhanced.

Figure 7:
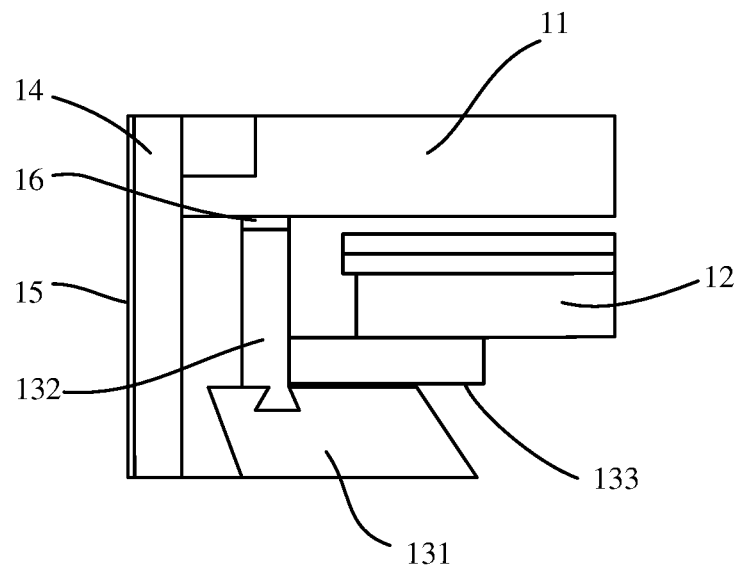
FIG. 7 shows a schematic cross-sectional view of another side of a display device according to embodiments of the present disclosure.

FIG. 7 shows a schematic cross-sectional view of another side of a display device according to embodiments of the present disclosure.

Referring to FIG. 7, the display device 1 further includes a circuit component and a protective layer 14. The circuit component covers a part of the side surface of the display panel 11, and the circuit component is electrically connected to the display panel 11. The protective layer 14 is arranged on an outer side of the side surface of the display panel 11 to protect the circuit component. It should be noted that the circuit component is used to control a display picture of the display panel 11. For example, the circuit component may include a circuit board and a chip on film (COF). The COF is connected to the display panel 11 and covers a part of the side surface of the display panel 11. The circuit board may be located on the outer side of the mold frame 131 and electrically connected to the COF.

For example, on the side surface of the display panel 11, the circuit component may be a structure that protrudes from the side surface of display panel 11. Once the circuit component is damaged, it is easy to cause a failure of the display panel 11. The protective layer 14 is provided on the side surface of the display panel 11 and may be fixedly connected to the frame body to protect the circuit component.

For example, the protective layer 14 is filled at a periphery of the circuit component, and an orthographic projection of the protective layer 14 on the side surface of the display panel 11 does not overlap with an orthographic projection of the circuit component on the side surface of the display panel 11.

For example, the circuit component may include a plurality of COFs distributed on the side surface of the display panel 11. The protective layer 14 may be arranged at a gap between the plurality of COFs, and the orthographic projection of the protective layer 14 on the side surface of the display panel 11 does not overlap with the orthographic projection of the COFs on the side surface of the display panel 11, thereby comprehensively protecting the plurality of COFs without affecting the COFs, so that the stability of the circuit component may be improved. For example, when a plurality of display devices 1 according to embodiments of the present disclosures are spliced, due to the function of the protective layer 14, it may prevent the protective layer 14 from squeezing the COFs, thereby avoiding damage to the display panel 11 and the circuit component on the side surface during the splicing process.

For example, the material of the protective layer 14 may be metal. In embodiments of the present disclosure, the protective layer 14 is made of a metal material and thus has a high strength, thereby ensuring that the protective layer 14 may effectively support and protect the circuit component.

Continuing to refer to FIG. 7, the display device 1 may further include a sealing adhesive 15 on a side of the protective layer 14 away from the display panel 11. In embodiments of the present disclosure, the sealing adhesive 15 is wrapped around the outer side of the display panel 11 to encapsulate the display panel 11 as well as the protective layer 14 and the circuit component on the side surface of the display panel 11.

Figure 8:
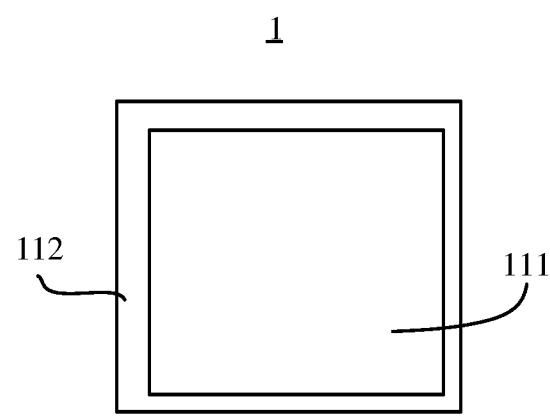
FIG. 8 shows a schematic plan view of a display device according to embodiments of the present disclosure.

FIG. 8 shows a schematic plan view of a display device according to embodiments of the present disclosure.

Referring to FIG. 8, the display panel 11 includes a display region 111 and a non-display region 112 surrounding the display region 111. A width of the non-display region 112 on any side of the display panel 11 ranges from 0.5 mm to 1.2 mm. As shown in FIG. 8, it should be noted that for the convenience of description, four sides of the display panel 11 are represented by a sky side, a ground side, a left side and a right side of the display panel 11, respectively. The sky side and the ground side of the display panel 11 are opposite to each other, and the left side and the right side of the display panel 11 are opposite to each other. The sky side and the left side of the display panel 11 are provided with circuit components, while no circuit components are provided on the ground side and the right side of the display panel 11.

For example, as the circuit components are provided on the sky side and the left side of the display panel 11, the non-display regions 112 on the sky side and the left side are relatively wider, while the non-display regions 112 on the ground side and the right side of the display panel 11 are relatively narrower. In related designs, as the frame body used to support the display panel 11 is opaque or has a poor light transmission performance, light may fail to pass through the frame body, so that light may not be received at a position where the display panel 11 is in contact with the frame body. That is, the pixels within a range of about 1 mm of the edge of the display panel 11 are dim. Therefore, the width of the non-display region 112 is generally designed to be more than 0.8 mm to prevent the pixels at the edge of the display panel 11 from being obstructed by the frame body to compromise the image quality. For example, when the pixels at the edges on the sky side and the left side of the display panel 11 are obstructed, the side surfaces are prone to problems such as rainbow stripes (which are caused by partial obstruction of RGB primary colors of light). When the pixels at edges on the ground side and the right side of the display panel 11 are obstructed, the side surfaces are prone to problems of dim pixels at the edges, resulting in unclear picture.

In embodiments of the present disclosure, the light transmission portion 132 is made of a transparent material, and the light transmission portion 132 in contact with the display panel 11 has a good light transmission performance. Therefore, the edge of the display panel 11 in contact with the light transmission portion 132 may obtain light refracted by the light transmission portion 132, that is, the light may reach an extreme edge of the display panel 11, so that the pixels at the edges of the display panel 11 may be displayed normally. This may solve an obstruction problem of the pixels at the four edges of the display panel 11, reduce the width of the non-display region 112 of the display panel 11, and improve the picture quality of the periphery of the display region 111 of the display panel 11.

Continuing to refer to FIG. 8, in a direction parallel to the display panel 11, the display panel 11 has a first side and a second side opposite to the first side. The width of the non-display region 112 on the first side of the display panel 11 is 1.2 mm, and/or the width of the non-display region 112 on the second side of the display panel 11 is 0.5 mm.

For example, on the sky side and the left side of the display panel 11, the width of the non-display region 112 is 1.2 mm as the circuit components require some spaces. On the ground side and the right side of the display panel 11, the width of the non-display region 112 is narrowed and may be 0.5 mm. Different from that a value of the width of the non-display region 112 is not less than 0.8 mm in the existing designs, the non-display region 112 in embodiments of the present disclosure may achieve a seam reduction of 0.3 mm, thereby achieving an ultra-narrow bezel of the display panel 11.

Figure 9:
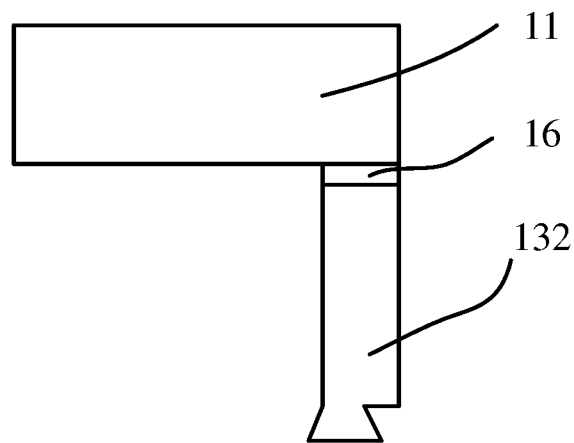
FIG. 9 shows a cross-sectional view of an installation of a display panel and a second supporting surface of a display device according to embodiments of the present disclosure.

FIG. 9 shows a cross-sectional view of an installation of a display panel and a second supporting surface of a display device according to embodiments of the present disclosure.

Referring to FIG. 9, the light transmission portion 132 is connected to the non-display region 112 of the display panel 11, and an orthographic projection of the non-display region 112 of the display panel 11 on the second supporting surface 1321 covers the second supporting surface 1321. For example, in embodiments of the present disclosure, the width of the non-display region 112 of the display panel 11 is equal to the width of the light transmission portion 132. Therefore, the light exited from the light transmission portion 132 may reach the non-display region 112 of the display panel 11, and a light compensation may be provided to the display region 111 through the non-display region 112, so as to ensure that the display region 111 of the display panel 11 may display a clear picture.

For example, the side of the light transmission portion 132 away from the light guide component 12 is aligned with a side surface of the display panel 11 and a side surface of the mold frame 131. For example, on the ground side and the right side of the display panel 11, an outer side of the light transmission portion 132 is aligned with an outer side of the mold frame 131, which helps to encapsulate the side surfaces of the display panel 11, the light transmission portion 132 and the mold frame 131 by using the sealing adhesive 15.

For example, the display panel 11 is bonded to the second supporting surface 1321 of the light transmission portion 132 through the optical adhesive 16, and the optical adhesive 16 includes a UV adhesive and/or a hot melt adhesive. In embodiments of the present disclosure, the display panel 11 is bonded to the light transmission portion 132 by using the optical adhesive 16 with good light transmittance, so that the light exited from the second supporting surface 1321 of the light transmission portion 132 may pass through the optical adhesive 16 and reach the display panel 11, thereby providing light for the edges of the display panel 11.

Embodiments of the present disclosure further provide a spliced display device 21, which may be spliced according to the display device 1 of the above mentioned embodiments. An example of the spliced display device 21 is illustrated below.

Figure 10:
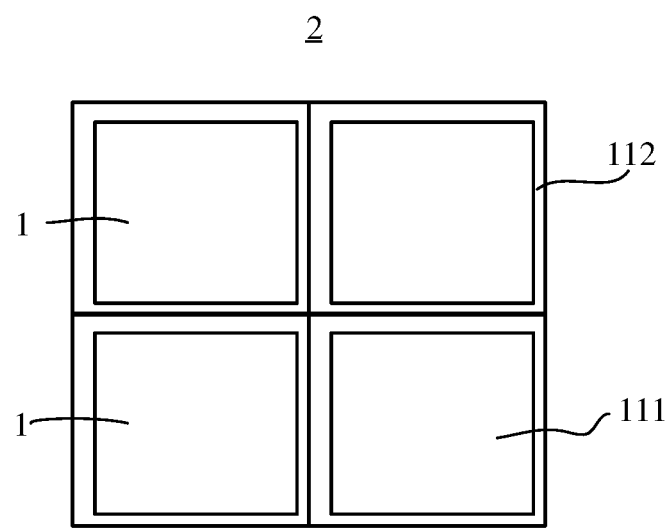
FIG. 10 shows a schematic plan view of a spliced display device according to embodiments of the present disclosure.
Figure 11:
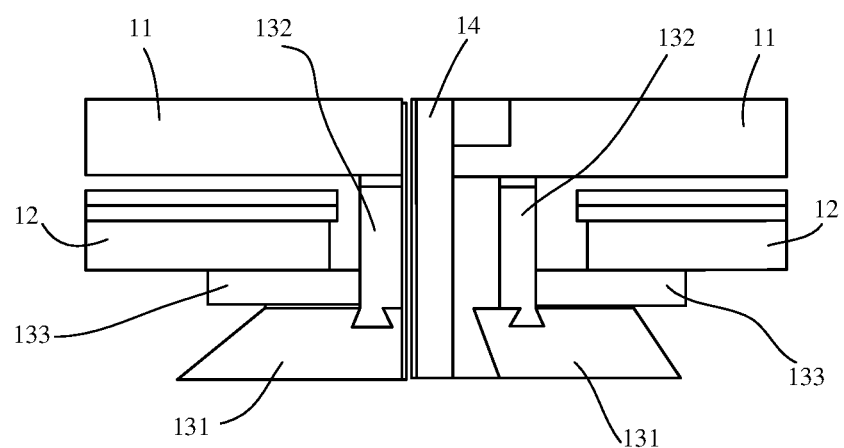
FIG. 11 shows a schematic partial cross-sectional view of adjacent display devices of a spliced display device according to embodiments of the present disclosure.

FIG. 10 shows a schematic plan view of a spliced display device according to embodiments of the present disclosure. FIG. 11 shows a schematic partial cross-sectional view of adjacent display devices of a spliced display device according to embodiments of the present disclosure. As shown in FIG. 10, a spliced display device 2 formed by splicing four display devices 1 is illustrated by way of example in describing embodiments of the present disclosure. It should be noted that the four display devices 1 shown in FIG. 10 are merely illustrative and should not be understood as limiting embodiments of the present disclosure.

Referring to FIG. 10 and FIG. 11, the spliced display device 2 may include a plurality of display devices 1, adjacent display devices 1 among the plurality of display devices 1 are spliced with each other, and a seam is formed between adjacent display devices 1. In the related art, when displaying a picture, the seam exhibits visually as a clear black edge or black seam, which affects an overall visual experience of the spliced display device 2. The display panel 11 of each display device 1 includes a display region 111 and a non-display region 112 surrounding the display region 111. When two display devices 1 are spliced, the non-display region 112 on one side of the display panel 11 of one display device 1 is spliced with the non-display region 112 on one side of the display panel 11 of the other display device 1, and the non-display regions 112 between adjacent display panels 11 directly affect the width of the seam.

In embodiments of the present disclosure, when each display device 1 is spliced, light may reach the pixels at the edges of the display panel 11 through the light transmission portion 132 and the light guide portion 133, that is, the pixels at the edges of the display panel 11 may not be obstructed, so that the width of the non-display region 112 of the display panel 11 may be minimized according to a process design. In this way, the width of the seam formed by splicing may be reduced, the actual value of the seam of spliced display device 2 may be the same as a design value, and the display picture quality after splicing may be improved.

Continuing to refer to FIG. 10 and FIG. 11, in some embodiments, due to different widths of the non-display regions 112 on opposite sides of the display device 1, a plurality of display devices 1 may be arranged in a cyclic manner, so that the widths of the seams formed between adjacent display devices 1 are identical to each other. For example, it is possible to splice a right side of a first display device 1 with a left side of a second display device 1, then splice a right side of the second display device 1 with a left side of a third display device 1, and arrange the display devices 1 in a cyclic manner so that the width of the seam between adjacent display devices 1 is a sum of the width of the non-display region 112 on the left side of one display device 1 and the width of the non-display region 112 on the right side of the other display device 1. In this way, the widths of the seams in the spliced display device 2 may be more uniform, and a display effect of a large screen may be improved in a practical scene application.

Although some embodiments according to the general concept of the present disclosure have been illustrated and described, it should be understood by those ordinary skilled in the art that changes may be made to those embodiments without departing from the principle and spirit of the general inventive concept of the present disclosure. The scope of the present disclosure is defined by the claims and their equivalents.

What is claimed is:

1. A display device, comprising:
   a display panel;
   a light guide component on a light entering side of the display panel; and
   a supporting assembly connected to the display panel and the light guide component, wherein the supporting assembly is configured to support the display panel and the light guide component,
   wherein the supporting assembly comprises:
      a frame body having a first supporting surface facing the display panel, and the light guide component is fixed on the first supporting surface, and
      a light transmission portion on the first supporting surface and on an outer side of a side surface of the light guide component, wherein the light transmission portion has a second supporting surface facing the display panel, the display panel is fixed on the second supporting surface, and the light transmission portion is configured to refract light so that the refracted light exits through the second supporting surface,
   wherein the frame body comprises a mold frame, the first supporting surface is located at an end of the mold frame facing the display panel, and the first supporting surface is parallel to the second supporting surface and parallel to a surface of the display panel; and
   wherein the mold frame comprises a fixing groove on the first supporting surface, and the light transmission portion comprises an inverted stuck component at an end of the light transmission portion away from the second supporting surface, and the inverted stuck component is embedded into the fixing groove.

2. The display device according to claim 1, wherein the mold frame is made of aluminum or an aluminum alloy material.

3. A spliced display device, spliced by a plurality of display devices according to claim 1.

4. The display device according to claim 1, wherein the fixing groove has a top surface coplanar with the first supporting surface and a bottom surface parallel to the first supporting surface, and
   wherein a cross-sectional area of the fixing groove in a direction parallel to the surface of the display panel gradually increases from the top surface to the bottom surface.

5. The display device according to claim 1, wherein when the inverted stuck component is embedded into the fixing groove, a periphery of the inverted stuck component fits an inner wall of the fixing groove, and
   wherein the inverted stuck component is molded in the fixing groove through injection molding.

6. The display device according to claim 1, wherein the display device further comprises a circuit component and a protective layer, the circuit component covers a part of a side surface of the display panel, the circuit component is electrically connected to the display panel, and the protective layer is provided on an outer side of the side surface of the display panel to protect the circuit component.

7. The display device according to claim 6, wherein the protective layer is filled at a periphery of the circuit component, and an orthographic projection of the protective layer on the side surface of the display panel does not overlap with an orthographic projection of the circuit component on the side surface of the display panel.

8. The display device according to claim 7, wherein the display device further comprises a sealing adhesive on a side of the protective layer away from the display panel.

9. The display device according to claim 1, wherein the supporting assembly further comprises a light guide portion on the first supporting surface and between the frame body and the light guide component, the light guide portion has a third supporting surface facing the display panel, and the light guide component is fixed on the third supporting surface, and
   the light guide portion is configured to refract light so that the refracted light exits through the third supporting surface.

10. The display device according to claim 9, wherein a side of the light guide portion facing the light transmission portion is abutted against a surface of the light transmission portion, and an orthographic projection of the light guide portion and the light transmission portion on the first supporting surface covers the first supporting surface.

11. The display device according to claim 10, wherein the light guide portion and the light transmission portion are formed as an integrated structure.

12. The display device according to claim 10, wherein the light transmission portion and/or the light guide portion are/is molded through injection molding.

13. The display device according to claim 10, wherein the light transmission portion and/or the light guide portion are/is made of a transparent material.

14. The display device according to claim 1, wherein the display panel comprises a display region and a non-display region surrounding the display region, and a width of the non-display region on any side of the display panel ranges from 0.5 mm to 1.2 mm.

15. The display device according to claim 14, wherein in a direction parallel to the display panel, the display panel has a first side and a second side opposite to the first side, and the width of the non-display region on the first side of the display panel is 1.2 mm; and/or the width of the non-display region on the second side of the display panel is 0.5 mm.

16. The display device according to claim 15, wherein the light transmission portion is connected to the non-display region of the display panel, and an orthographic projection of the non-display region of the display panel on the second supporting surface covers the second supporting surface, and wherein a side of the light transmission portion away from the light guide component is aligned with a side surface of the display panel and a side surface of the mold frame.

17. The display device according to claim 1, wherein the display panel is bonded to the second supporting surface of the light transmission portion through an optical adhesive, and the optical adhesive comprises a UV adhesive and/or a hot melt adhesive.

18. The display device according to claim 6, wherein the protective layer is made of a metal material.

* * * * *